(12) United States Patent
Elliott

(10) Patent No.: US 8,082,444 B1
(45) Date of Patent: Dec. 20, 2011

(54) SYSTEM AND METHOD FOR ADDING NEW NETWORK DEVICES TO AN EXISTING NETWORK

(75) Inventor: Brig Barnum Elliott, Arlington, MA (US)

(73) Assignees: Verizon Corporate Services Group Inc., Basking Ridge, NJ (US); Raytheon BBN Technologies Corp., Cambridge, MA (US)

( * ) Notice: Subject to any disclaimer, the term of this patent is extended or adjusted under 35 U.S.C. 154(b) by 1007 days.

(21) Appl. No.: 11/087,144

(22) Filed: Mar. 23, 2005

Related U.S. Application Data

(60) Provisional application No. 60/556,098, filed on Mar. 25, 2004.

(51) Int. Cl.
*H04L 9/32* (2006.01)
*G06F 15/16* (2006.01)

(52) U.S. Cl. ......... 713/171; 709/201; 709/227; 709/229

(58) Field of Classification Search .................. 709/220; 455/434, 435.1
See application file for complete search history.

(56) References Cited

U.S. PATENT DOCUMENTS

| | | | | |
|---|---|---|---|---|
| 6,098,098 | A * | 8/2000 | Sandahl et al. | 709/221 |
| 6,671,810 | B1 * | 12/2003 | Jardin | 726/3 |
| 6,687,817 | B1 * | 2/2004 | Paul | 713/1 |
| 6,782,474 | B1 * | 8/2004 | Ylonen | 713/162 |
| 6,901,439 | B1 * | 5/2005 | Bonasia et al. | 709/220 |
| 7,039,392 | B2 * | 5/2006 | McCorkle et al. | 455/411 |
| 7,418,591 | B2 * | 8/2008 | Tachikawa | 713/155 |
| 2001/0019559 | A1 * | 9/2001 | Handler et al. | 370/468 |
| 2002/0147797 | A1 * | 10/2002 | Paul | 709/220 |
| 2003/0079000 | A1 * | 4/2003 | Chamberlain | 709/220 |
| 2003/0200297 | A1 * | 10/2003 | Wiener | 709/223 |
| 2004/0049586 | A1 * | 3/2004 | Ocepek et al. | 709/229 |
| 2004/0068567 | A1 * | 4/2004 | Moran et al. | 709/227 |
| 2004/0168081 | A1 * | 8/2004 | Ladas et al. | 713/201 |
| 2004/0205201 | A1 * | 10/2004 | Katsube et al. | 709/229 |
| 2004/0250072 | A1 * | 12/2004 | Ylonen | 713/170 |
| 2005/0005003 | A1 * | 1/2005 | Maekawa | 709/223 |
| 2005/0114474 | A1 * | 5/2005 | Anderson et al. | 709/220 |
| 2005/0120216 | A1 * | 6/2005 | Lee et al. | 713/171 |

* cited by examiner

*Primary Examiner* — Nathan Flynn
*Assistant Examiner* — Trang Doan

(57) ABSTRACT

A system and method for adding a new network device to an existing network is described. An existing network has at least one master network device that acts as the gatekeeper for adding new network devices to the network. The master network device receives a request from a new network device to join the network. In response, the master network device issues a request to the new network device to perform a specified action. The master network device receives verification from the human user that the specified action has been performed. Upon receiving the verification, the master network device adds the new network device to the network.

19 Claims, 3 Drawing Sheets

SYSTEM AND METHOD FOR ADDING NEW NETWORK DEVICES TO AN EXISTING NETWORK

CROSS-REFERENCE TO RELATED APPLICATIONS

This application claims priority to U.S. Provisional Application Ser. No. 60/556,098, by BRIG B. ELLIOTT filed on Mar. 25, 2004, and entitled SETTING UP A PRIVATE NETWORK, the contents of which is hereby incorporated by reference in its entirety.

FIELD

This application relates to data networks, and particularly to methods and systems for adding a new network device to an existing network.

BACKGROUND

Local area networks ("LANs" or "networks") allow multiple electronic devices, such as computers, printers, scanners, cameras, various sensing devices, stereo equipment, etc. (collectively "network devices"), to communicate with each other and with other electronic devices over a shared connection to a wide area network, such as the Internet. Networks have become common in offices and home settings. Networks may be configured as "wired" networks, "wireless" networks, or a combination of the two. "Wired" networks allow network devices to communicate with each other over electrical wires (i.e., data cables) and "wireless" networks allow network devices to communicate with each other without the use of data cables, such as over radio frequency or infrared transmissions.

Network security is a concern with virtually any network. Wireless networks are particularly susceptible to being accessed by unauthorized users. For example, virtually any wireless-enabled network device can access a wireless network if the wireless-enabled device is brought into range of the transmitted wireless communications of the network. To prevent unauthorized access, many networks (both wired and wireless) use various encryption techniques to encrypt the communications between authorized network devices. In this way, only network devices that have been previously "added" to the network and thus know the encryption keys can decrypt the encrypted network communications. As a result, encrypted networks are more secure than non-encrypted networks.

It is common to add new network devices to an existing network from time to time. Adding a new network device to an encrypted network, though, tends to require a relatively higher level of skill and knowledge of network encryption, protocols, etc. that is beyond many mainstream network users. Accordingly, adding new network devices to an encrypted network can sometimes be difficult for relatively non-sophisticated users. Thus, there is a need for a system and method for adding a new network device to an existing network that is both simple and secure.

SUMMARY

Embodiments of a system and method for adding a new network device to an existing network is described. An existing network has at least one master network device that acts as the gatekeeper for adding new network devices to the network. The master network device receives a request from a new network device to join the network. In response, the master network device issues a request to the new network device to perform a specified action. In some embodiments, the specified action is visually or audibly observable by a human user, such as blinking an indicator light, for example. The master network device receives verification from the human user that the specified action has been performed. Upon receiving the verification, the master network device adds the new network device to the network.

BRIEF DESCRIPTION OF THE DRAWINGS

Embodiments of the present invention will now be described, by way of example, with reference to the accompanying drawings, in which.

DETAILED DESCRIPTION OF EMBODIMENTS

I. Overview

A system and method for adding a new network device to an existing network is described. In an embodiment of the system and method, the existing network has at least one master network device, which acts as the gatekeeper for facilitating and permitting the addition of new network devices to the network. A new network device communicates a request to the master network device to be added to the network. The master network device establishes a pair-wise encryption key for subsequent communications specifically between the master network device and the new network device during the process of adding the new network device to the network. Using this new encryption key, the master network device sends an encrypted message to the new network device, requesting that the new network device perform some sort of easily-observable action, such as for example, blinking a light on the new network device. A human user verifies to the master network device that the new network device has performed the requested action. Upon such verification, the master network device adds the new network device to the network and provides all of the network encryption keys to the new network device, thereby permitting it to participate in future encrypted network communications.

II. Introduction of Elements

Figure 1:
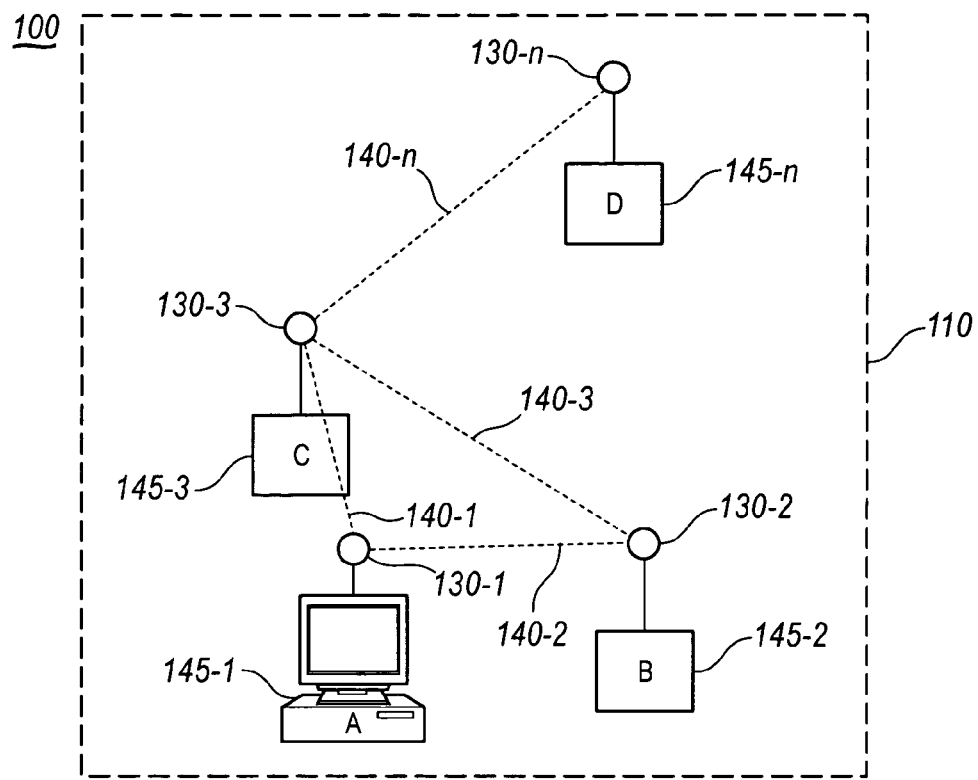
FIG. 1 illustrates a schematic view of an exemplary existing network.

The present systems, methods, and apparatuses may be implemented in any suitable network. FIG. 1 is a block diagram illustrating an example of a network management system 100 implemented in an exemplary network 110, according to one embodiment. The system 100 may be implemented using a variety of hardware approaches known to those of ordinary skill in the art, and the instructions for implementation may be stored using a computer-readable medium or media. The instructions may be in the form of software and/or firmware applications, or in any other suitable form.

As shown in FIG. 1, the network 110 may include nodes 130-1 through 130-*n* (collectively "the nodes 130") connected by links 140-1 through 140-$n$ (collectively "the links 140"). The nodes 130 are configured to transmit messages (e.g., packets) over the links 140. The messages may be transmitted using known or not yet developed network communication technology. In FIG. 1, the nodes 130 are connected to, or otherwise associated with, network devices 145-1 through 145-$n$ (collectively "the network devices 145"). Network 110 includes at least one "master network device," shown in FIG. 1 as network device 145-1.

While an exemplary implementation of the system 100 is shown in FIG. 1, those skilled in the art will recognize that the exemplary components illustrated in FIG. 1 are for purposes of illustration and not intended to be limiting. Indeed, those skilled in the art will recognize that other alternative network environments may be used in other embodiments. Each element shown in FIG. 1 will now be discussed in greater detail.

A. Network

The network 110 may be in the form of a wide variety of different types and/or configurations of networks, including network types and configurations known to those of ordinary skill in the art. The network 110 may be of any size having any number of nodes 130. However, in some embodiments, it is preferable that the network 110 is relatively small, such as the size of a home or small-business network 110. The network 110 may employ any suitable technology or technologies (e.g., routing technologies) that enable transmission of messages between the nodes 130.

B. Links

The network 110 may use any known or not yet developed communication medium or media for the transmission of messages between the nodes 130. For example, the links 140 may comprise any known medium or media capable of carrying messages between the nodes 130 of the network 110. The links 140 may be in the form of wireless connections, including, but not limited to radio frequency connections (e.g., cellular connections), infrared connections, or any other known type of wireless connection. The links 140 may be in the form of non-wireless connections such as telephone lines, cable lines, fiber lines, etc.

The links 140 may support use of any suitable transmission protocol. For example, the links 140 may be capable of supporting wireless fidelity ("WiFi") connections conforming to 802.11a/b/g protocols and/or Ethernet protocol connections, which are well known to those skilled in the art.

C. Nodes

The nodes 130 include connections to the links 140 of the network 110 and configured to provide an interface between the network devices 145 and the links 140. Through the nodes 130, the network devices 145 are able to send and receive messages over the network 110.

The nodes 130 may include any network interface known to those of ordinary skill in the art. The nodes 130 may be external of the network devices 145 and the visual identifier devices 150, or the nodes 130 may be integrated as part of the network devices 145.

D. Network Devices

The network devices 145 may comprise any device or devices capable of communicating over the links 140. In other words, the network devices 145 may include any device having networking capability. The devices 145 may be in the form of routers, switches, gateways, general computers, dedicated computers, workstations, personal digital assistants, cellular telephones, cellular pagers, satellite telephones, satellite pagers, e-mail devices, network interface cards, printers, scanners, cameras, actuators, door bells, locks, vehicles, and any other device having networking capability. The network devices 145 may also be in the form of network-capable sensors (e.g., wireless sensors) such as smoke detectors, thermostats, pressure sensors, motion detectors, light sensors, security sensors, electrical sensors, chemical sensors, or other similar devices.

Further, the network devices 145 may include any hardware, firmware, and/or software useful for implementing and operating the system 100. For example, the "master network device" 145-1 (also depicted as device "A") includes hardware, firmware, and/or software that permits it to act as the gatekeeper for adding new network devices to the network, as described in more detail below. Further, as is known in the art, the master network device includes a storage medium for maintaining information relating to the authorized network devices and encryption methodology of the network. For example, the master network device maintains or has access to a database of authorized network devices, i.e., network devices 145 that have previously been approved to join the network. Further, the master network device 145-1 stores and administers one or more network encryption keys, known by all authorized devices on the network, that allow all network devices to encrypt and decrypt communications over the network. Further, as is known in the art, the master network device may include a database of other encryption keys that are specific to different pairs (or groups) of network devices ("pair-wise" encryption keys), such as well-known Diffie-Hellman keys, which allow particular pairs (or groups) of network devices to transmit and receive secure communications among themselves to the exclusion of other authorized devices on the network. In a network having multiple master network devices, all of the master network devices store or have access to the information and databases relating to the authorized network users and network encryption keys.

Figure 2:
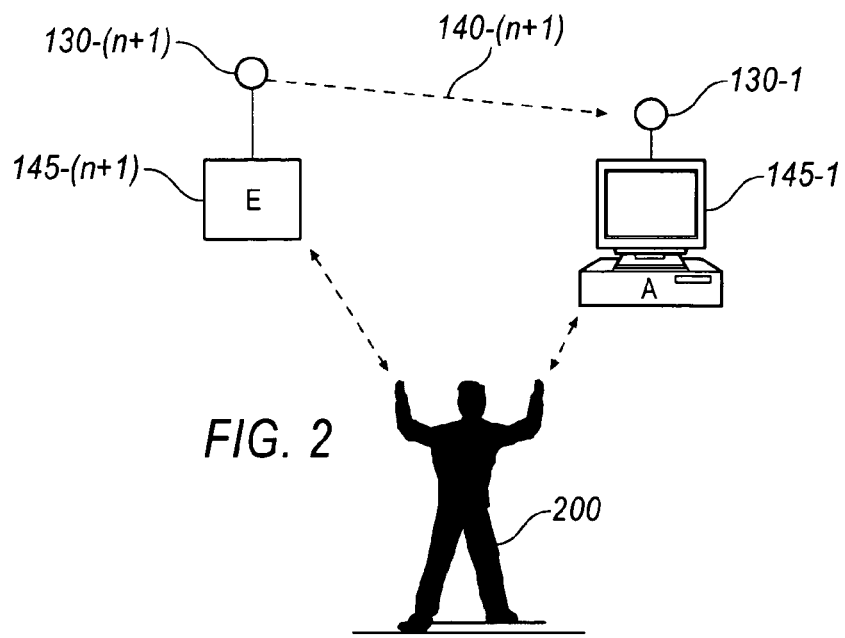
FIG. 2 illustrates the exemplary network of FIG. 1 and further illustrates the addition of a new network device to the existing network, according to one embodiment.

FIG. 2 shows the master network device 145-1 from FIG. 1 and schematically shows the addition of a new network device 145-($n$+1) (also depicted as device "E") to the network 110 illustrated in FIG. 1. Specifically, new network device 145-($n$+1) communicates with the master device 145-1 over through node 130-($n$+1) and over link 140-($n$+1). Also shown is human user 200, who verifies to the master network device 145-1 that the new network device 145($n$+1) performs a specified task in response to a request from the master network device 145-1, as described in more detail below.

E. An Exemplary Process of Adding a New Network Device

Figure 3:
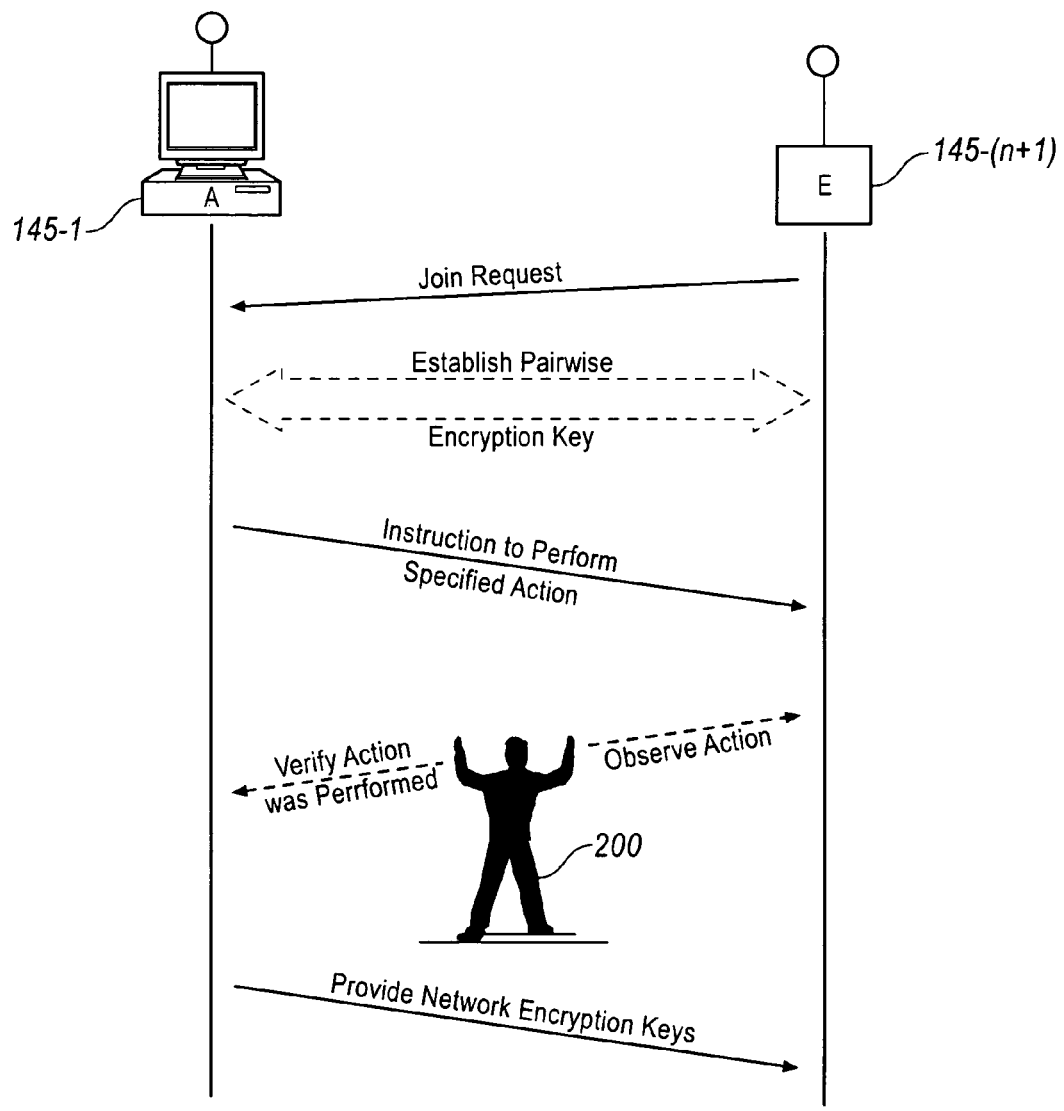
FIG. 3 is a logical diagram that illustrates the interaction of the master network device, the master network device, and a human user during the process of adding the new network device to the existing network, according to one embodiment.

FIG. 3 is a logical diagram that illustrates the interaction between a new network device 145-($n$+1) and a master network device 145-1 when the new network device is added to the existing network, according to an embodiment. To begin, the new network device is brought into the wireless range of the master network device. In the case of a wired network, the new network device could be physically plugged into a network connector. In any event, the new network device sends a "join" request to the master network device. Because the new network device does not know the Net UID (the "address" for sending messages) for the master network device, the new network device can send the "join" request using a radio frequency or network-layer broadcast signal, or other methods that allow the new network device to initially communicate with the master network device. Upon receiving the "join" request, the master network device initiates a cryptographic key agreement protocol, such as the well-known Diffie-Hellman algorithm, that generates a shared, pair-wise encryption key that allows the master network device and the new network device to transmit and receive encrypted messages that are not receivable by other network devices. This new encryption key is unique to the new network device and the master network device, and it is used to encrypt (and decrypt) subsequent messages between the new network device and the master network device throughout the rest of the process of adding the new network device to the network.

After the pair-wise encryption key is generated, the master network device sends an instruction to the new network device to perform a specified action. A wide variety of different actions would be acceptable. In some embodiments, the action is one that is visually or audibly observable by the human user 200, such as, for example, blinking an indicator light on the new network device. In some embodiments, the specified action will be the same for each new device that requests to join the network, and in other embodiments, the specified action may be different from one new device to the next. In some embodiments, the master network device may randomly request different specified actions from one new device to the next. Regardless of the nature of the specified action, the new network device receives the instruction from the master network device and performs the specified action. The human user observes that the new network device has performed the specified action and verifies to the master network device that it has been performed. For example, a dialogue box may be displayed on the master network device asking if the specified action has been performed, and the human user 200 may type an answer or click a button on the display of the master network device to indicate that the new network device has performed the specified action. The master network device can be configured to receive the verification from the human user through a number of different input devices, including a keyboard, a mouse, a touch screen receiver, and a voice recognition receiver, for example. In other embodiments where the user desires a more automated method for adding new network devices, the verification could be "assumed" after a given period of time that the master device does not receive a negative indication from the human user. After receiving verification from the human user 200, the master network device adds the new network device to the database of authorized network devices and provides the new network device with the various encryption keys and other information that enable the new network device to access and communicate over the network. At this point, the new network device has been added to the network.

To implement the process described above, the master network device and the new network device may need to have application software loaded that implements the sequence of communications between the new network device and the master network device described above. The software may also generate and convey the pair-wise encryption key(s) used to encrypt and decrypt the communications between the new network device and the master network device during the process described above for adding the new network device.

F. Process Flow Diagram

Figure 4:
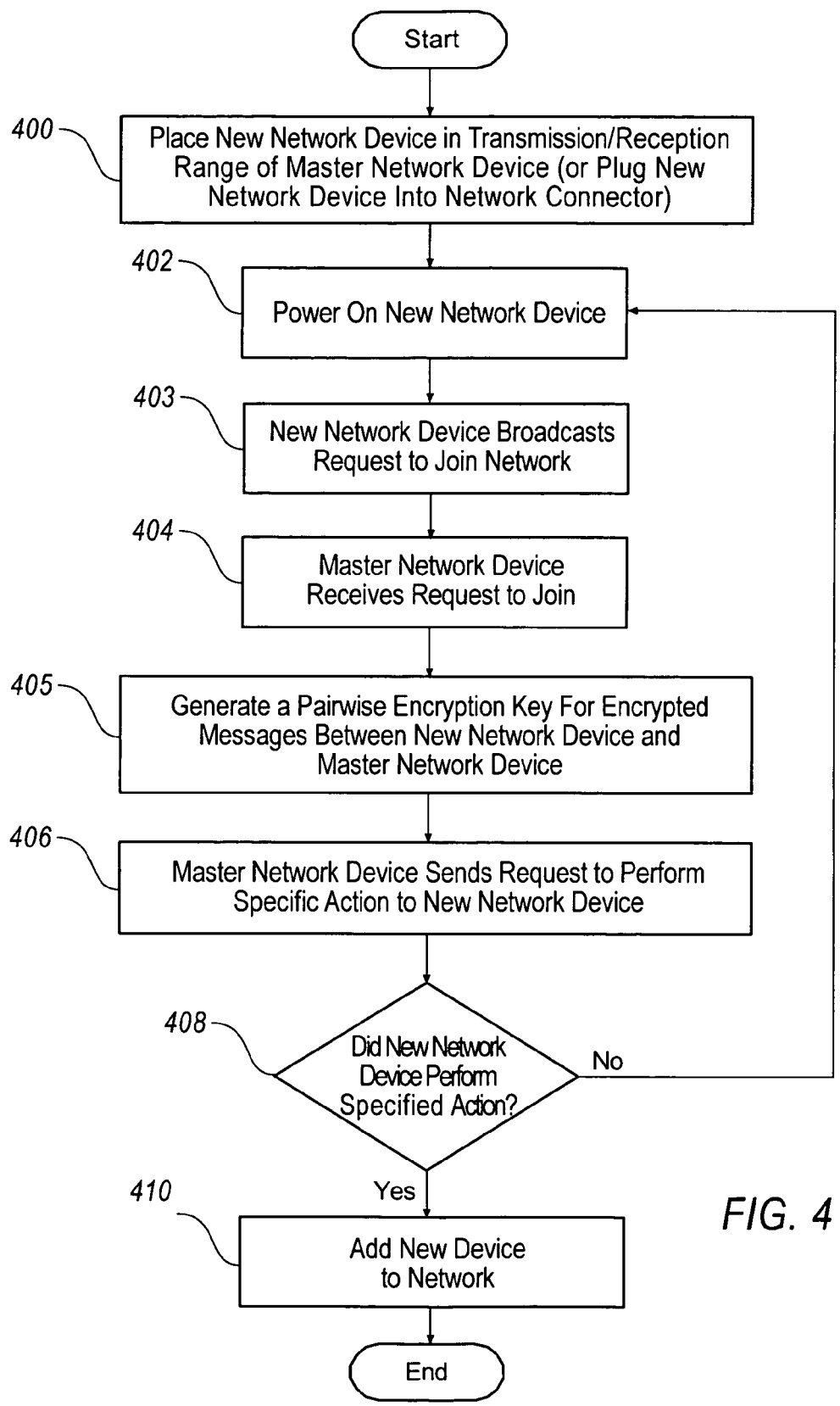
FIG. 4 is a process flow diagram that shows the steps undertaken during the process of adding the new network device to the existing network, according to one embodiment.

FIG. 4 shows an exemplary process flow for adding a new network device to an existing encrypted network, as described above. The process begins at step 400 with the human user placing a new device within the transmission/reception range of a master network device of the network. The process advances to step 402, where the user powers on the new device. At step 403, the new device broadcasts a request to join the network. Because the master network device is within transmission/reception range of the new network device (or physically connected to the network), the master network device receives the request to join, as shown at step 404. Then, at step 406, the master network device generates a pair-wise encryption key, using an algorithm such as the well-known Diffie-Hellman algorithm, which is used in subsequent communications between the master network device and the new network device in this process. At step 406, the master network device sends an encrypted message to the new network device, requesting that the new network device perform a specified observable action, such as for example, blinking an indicator light. A human user observes the new network device to determine if the new network device actually performs the requested action, as shown at step 408. If the human user does not verify that the new network device performed the requested action, then this is an indication that the new network device did not receive the request from the master network device. This could be because the request was intended for the new network device, but not received. Alternatively, it could be because the master network device is actually communicating with a non-authorized network device (such as a network device located in a different office or in the neighbor's house) instead of the new network device. In either case, the process recycles to step 402 and repeats. If the human user verifies to the master network device that the new network device performed the requested action, then the master network device knows that the new network device is authorized to join the network. Thus, at step 410, the master network device adds the new network device to the network and provides the network encryption keys and other necessary network communication information to the new network device. At this point, the new network device addition algorithm is complete.

The above-described embodiment allows a new network device to be added to an existing network in a simple and secure manner. A human user need only be able to observe that the new network device has performed a specified action and to verify such to the master network device. Further, the above-described system and method limits unauthorized network devices (such as network devices in nearby offices or homes) from being added to the network. If an unauthorized network device requests to be added to the network, it may be requested by the master network device to perform the specified action, but a human user will not verify to the master network device that the action has been performed. Accordingly, the master network device will not add the unauthorized device to the network.

While the present invention has been particularly shown and described with reference to the foregoing preferred and alternative embodiments, it should be understood by those skilled in the art that various alternatives to the embodiments of the invention described herein may be employed in practicing the invention without departing from the spirit and scope of the invention as defined in the following claims. The foregoing embodiments are merely illustrative, and no single feature or element is essential to all possible combinations that may be claimed in this or a later application. It is intended that the following claims define the scope of the invention and that the method and apparatus within the scope of these claims and their equivalence are covered thereby.

The invention claimed is:

1. A system comprising: a new network device; a master network device in communication with a network, said master network device being configured to receive a request to join the network from the new network device and to issue a request to the new network device to perform a specified action verifiable to a user; wherein the new network device is configured to present the specified action to the user; and said master network device being further configured to receive verification from the user that the new network device performed the specified action and add the new network device to the existing network after receiving the verification from the user; wherein said master network device includes a cryptographic key agreement protocol stored therein, said cryptographic key agreement protocol configured to generate a pair-wise encryption key for subsequent encrypted communication between the new network device and said master network device in response to said request to join the network; wherein said master network device is configured to generate a different specified action from one new network device to the next; and wherein said different specified action is a random specified action generated by said master network device.

2. The system of claim 1, wherein said request to join the network is a wireless transmission.

3. The system of claim 1, wherein said verification is provided to said master network device by a human user through an input device associated with said master network device.

4. The system of claim 3, wherein said input device is selected from the following: a keyboard, a mouse, a touch screen receiver, and a voice recognition receiver.

5. The system of claim 1, wherein said master network device is a computer.

6. The system of claim 1, wherein said specified action is either visibly or audibly observable by a human user.

7. The system of claim 6, wherein said specified action is blinking an indicator light on the new network device.

8. The system of claim 1, wherein said master network device is configured to provide network encryption keys to the new network device subsequent to receiving verification that the new network device has performed the specified action.

9. A method comprising the steps of: receiving a request to join a network from a new network device; requesting that the new network device perform a specified action verifiable by a user; presenting the specified action to the user at the new network device; verifying that the new network device has performed the action based upon an input received from the user at a master network device; generating a pair-wise encryption key to be used by said master network device and the new network device for subsequent communications therebetween, said pair-wise encryption key being generated after the step of receiving said request to join the network from the new network device; and adding the new network device to the network after receiving the input from the user; wherein said specified action is different from one new network device to the next; and wherein said specified action is randomly generated by said master network device from one new network device to the next.

10. The method of claim 9, wherein said request to join the network is a broadcast transmission from the new network device.

11. The method of claim 9, wherein said request to join the network is a wireless transmission from the new network device.

12. The method of claim 9, wherein said specified action is either audibly or visually observable by a human user.

13. The method of claim 9, wherein said specified action is blinking an indicator light on the new network device.

14. The method of claim 9, wherein said verification step further comprises receiving an input from a human user through an input device that is associated with said master network device.

15. The method of claim 14, wherein said input device is chosen from the following: a keyboard, a mouse, a touch screen receiver, and a voice recognition receiver.

16. The method of claim 9, wherein said step of adding the new network device to the network comprises adding an identification of the new network device to a database of authorized network devices accessible by said master network device.

17. The method of claim 9, wherein said step of adding the new network device to the network comprises providing network encryption keys to the new network device.

18. The method of claim 9, wherein said pair-wise encryption key is generated using a Diffie-Hellman algorithm.

19. The method of claim 9, wherein said request to join the network is generated by the new network device in response to having its power turned on.

\* \* \* \* \*